Nov. 28, 1939.  A. F. ECKEL  2,181,725
REFLECTOR
Filed Dec. 28, 1936  2 Sheets-Sheet 1
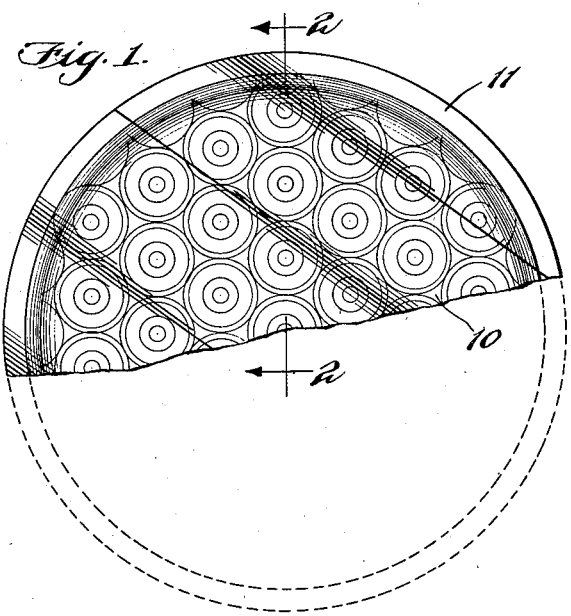
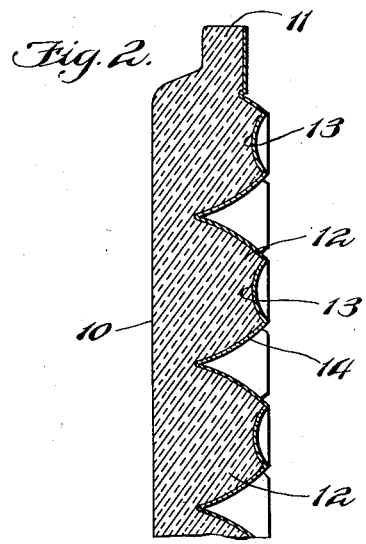
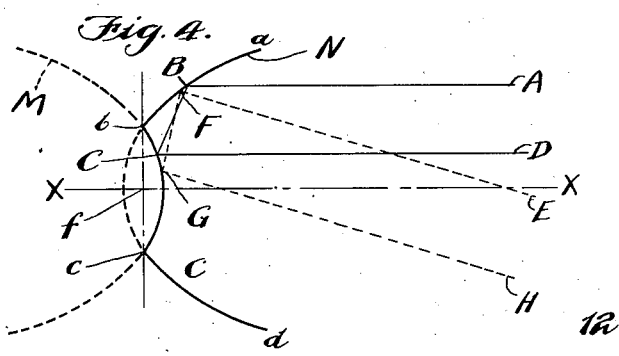
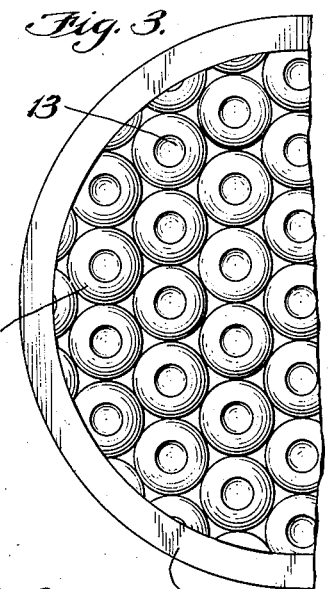
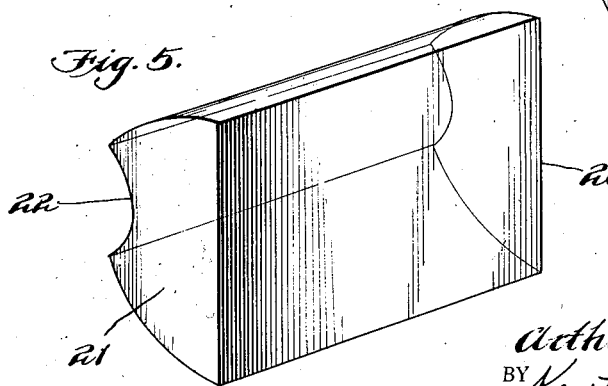
INVENTOR:
Arthur F. Eckel
BY Kent W. Worrell
ATTORNEY.

Nov. 28, 1939.　　　A. F. ECKEL　　　2,181,725
REFLECTOR
Filed Dec. 28, 1936　　　2 Sheets-Sheet 2
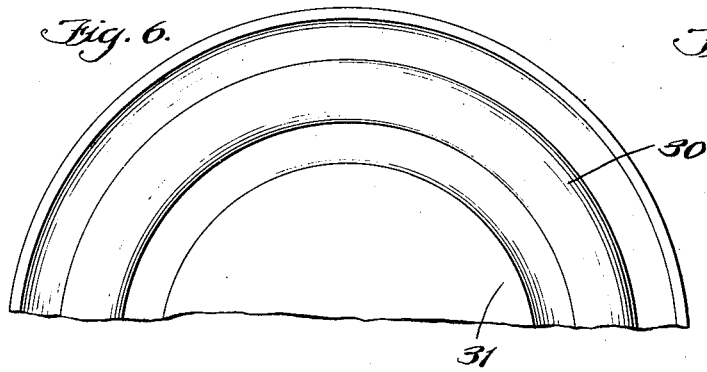
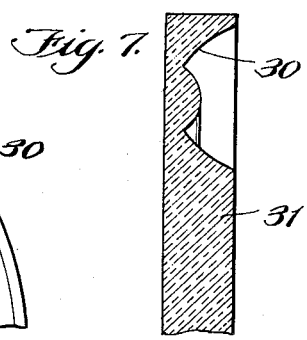
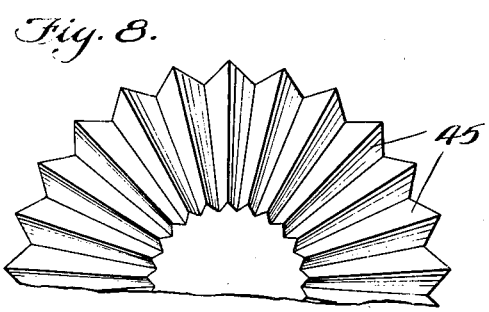
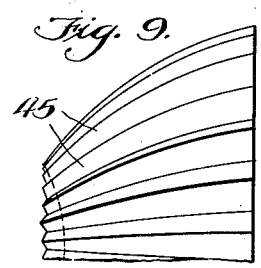
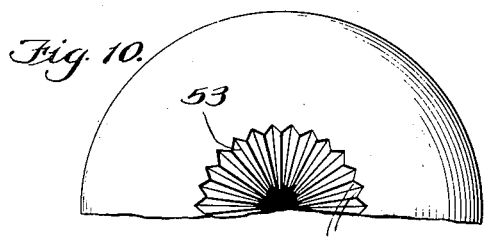
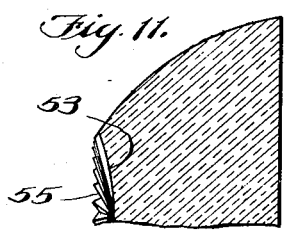
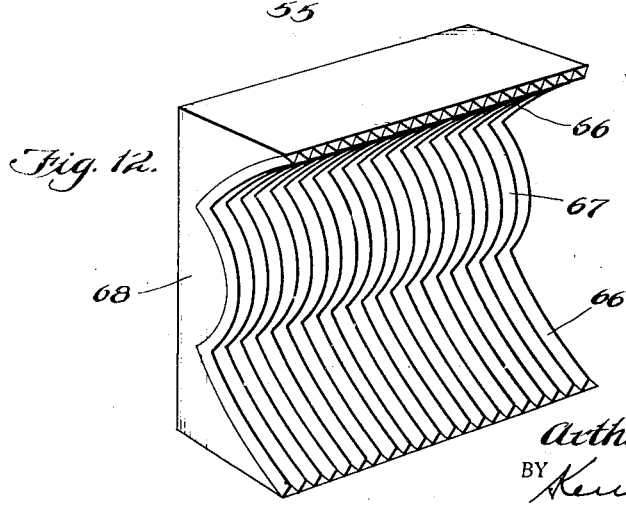
INVENTOR:
Arthur F. Eckel
BY Kent W. Wonnell
ATTORNEY.

Patented Nov. 28, 1939

2,181,725

UNITED STATES PATENT OFFICE 2,181,725

REFLECTOR

Arthur F. Eckel, Chicago, Ill.

Application December 28, 1936, Serial No. 117,696

6 Claims. (Cl. 88—78)

This invention relates to a light reflecting device used for safety signals, road signs, advertising signs, for interior illuminating units, and the like.

An important object of the invention is in the provision of a reflecting unit for returning a reflected ray parallel to the incident ray.

A further object of the invention is in the provision of an improved lens or reflector comprising reflecting surfaces composed of two paraboloids having a common focus and one inverted with respect to the other on a common axis.

A still further object of the invention is in utilizing different portions of two parabolic surfaces for providing a reflecting structure comprising a system of circular, or linear grooves of parabolic cross section on a flat, spherical, or any geometrical surface to produce different reflecting effects.

Other objects of the invention will appear hereinafter, the accompanying drawings illustrating preferred embodiments of the invention, in which Fig. 1 is a face view of a portion of a reflector constructed in accordance with the principles of this invention;

Fig. 2 is a section taken on the line 2—2 of Fig. 1;

Fig. 3 is a partial view of the back of a reflector as shown in Fig. 1;

Fig. 4 is a diagrammatic view illustrating the parallel relation of incident and reflected rays in a lens or reflector of this kind;

Fig. 5 shows the outlines of a linear lens or reflector embodying this principle of design;

Figs. 6 and 7 are face and sectional views of a portion of a circular lens or reflector embodying this design;

Figs. 8 and 9 are end and side views of an angularly grooved reflecting unit embodying the present invention;

Figs. 10 and 11 are end and sectional views of a portion of a reflecting unit in which the smaller inverted paraboloid has angle grooves; and Fig. 12 illustrates an angularly grooved linear paraboloid surface.

This invention relates particularly to a reflector in which the units thereof comprise the properties of two parabolic curves having a common focus as illustrated particularly in Fig. 4, one curve being inverted or oppositely disposed with respect to the other on a common axis and different portions of each curve being preserved and combined to provide a composite reflector. Utilizing this principle, reflector units of various types may be produced, some of which are here illustrated.

Each reflector unit comprises a reflecting surface represented in Fig. 4 by the intersection of two parabolas M and N having a common focus $f$, the axes of the parabolas being on a line X—X, one inverted with respect to the other and preserving a central portion of one parabola together with the exterior portion of the other to form a reflecting unit abcd in which the central portion bc extends inwardly with respect to the outer sides thereof. In a reflector having surfaces of this kind, the property of the reflector is to return an incident ray in the same direction from which it came; an incident ray of light AB is reflected at B along the line BC toward the focus $f$. The inverted parabolic surface intercepts the ray before it arrives at the focus and since this surface has the same focal point, the ray appears to emerge from the point $f$ but owing to the geometrical relationships involved the ray is reflected along the line CD parallel to AB. This relationship of parallelism is reciprocal in that an incident ray DC will be reflected upon a reverse path along the parallel line BA.

If the rays under discussion are appreciably oblique to the reference axis X—X as shown in the dotted lines EFGH, the emerging rays will be sufficiently parallel to the incident rays to meet the requirements of parallel reflection for rays which are appreciably oblique to the axis.

A reflector having units embodying the properties of such a combination of curves, is shown in Figs. 1, 2 and 3, and comprises a lens or reflector, either circular or any other desired shape, preferably made of glass, having a plain, smooth outer surface 10 with a projecting rim 11 by means of which the lens may be securely fastened in place about the margin thereof. The rear or under surface of the lens is cored out, cast or formed to provide closely spaced parabolic projections 12 each having a depressed parabolic center 13. The curves of the paraboloid surfaces 12 and 13 conform to the curvature of the surface abcd as shown in Fig. 4 so that each projection may be considered as formed by this curve as revolved about the axis of symmetry X—X. This surface as viewed from the face side 10 of the lens has the property of reversing a parallel bundle of light rays parallel to the incident direction, both parallel to the axis of the lens and at appreciable oblique angles thereto as represented in Fig. 4. Thus a lens having these properties is highly desirable as a reflector for roadside signs and in any other place where an illuminating unit of this kind may be desired.

Instead of the curve *abcd* forming a circular reflecting unit it may be used to generate a lens or reflector 20 comprising a linear reflecting block 21 with a parabolic groove 22 at the bottom as shown more clearly in Fig. 5, or as shown in Figs. 6 and 7, a circular groove 30 or a plurality of such grooves may be formed in a lens 31 having a common or different centers. Thus it is apparent that a generating curve *abcd* may be translated on a surface of any geometrical figure, in radial, concentric or lateral paths forming a system of inverted parabolic grooves. In each case this inverted parabolic system returns a beam or bundle of light rays back on themselves for all angles of incidence, which consequently produces a reflecting unit of exceedingly high intrinsic brilliance for all perpendicular rays and for oblique angles of incidence to within almost ninety degrees to the normal to the surface.

As indicated in Fig. 4 each reflector unit is best made up of a circular paraboloid truncated or cut off in a plane through the focus, perpendicular to the axis and including the cord *b—c* which is known as the latus rectum of the parabola.

In practice the rear or back surface of the lens or reflector may be provided with a silvered or mirror coating 14 which makes the reflector lens extremely brilliant.

These surfaces may be provided with right angled or dihedral grooves, within the critical angle of reflection for the material used, thus utilizing the characteristics of total reflection of the conventional right angled reflecting prism and rendering it unnecessary to silver the reflector. In a parabolic reflector unit of the type employed in the reflector shown in Figs. 1, 2 and 3, either the outer curved surface 14 may be provided with angular grooves 45 as shown by Figs. 8 and 9, or the inner dome surface 53 may be provided with angular grooves 55 as shown by Figs. 10 and 11. Furthermore, angular grooves 66 and 67 may be applied to the outer and inner parabolic surfaces of a lens or reflector 68 as shown by Fig. 12. The surfaces may be grooved longitudinally of the axis as in Figs. 8 and 9, or radially as in Figs. 10 and 11 with a system of small 90° dihedral angles.

Thus it is apparent that a reflecting unit of high brilliance may be obtained by providing units having a combined parabolic curve either in a simple smooth form with the addition of a mirror backing, or the reflecting surfaces may be modified by the addition of right angle reflecting prism surfaces. For small reflectors it is found extremely practical and efficient to cover the backs of the reflector units with a silver backing which is adequately protected when the rim of the reflector is engaged for holding it in any suitable reflecting position.

I claim:

1. A light reflecting unit having a reflecting surface comprising a paraboloid truncated at right angles to the axis and through the focus thereof, and the apex portion of a second paraboloid substantially identical with the first mentioned paraboloid and inverted with respect thereto connected to the first paraboloid so that the axes and foci of the two paraboloids are coincident.

2. A light reflecting unit comprising a solid paraboloid of light transmitting material, the apex of the paraboloid having a paraboloidal recess therein, the foci and axes of the paraboloid and the paraboloidal recess being substantially coincident.

3. An auto-collimating reflector plate of light transmitting material having a plain front face and a plurality of light reflecting units at the back each comprising a paraboloidal projection perpendicular to the front face of the plate with a paraboloidal recess extending inwardly at the apex of the projection, the foci and axes of the paraboloidal projection and the paraboloidal recess being substantially identical.

4. A reflector plate in accordance with claim 3 comprising an outwardly extending marginal rim providing means for supporting the plate, and a mirror coating for the backs of the said projections.

5. In a reflector an auto-collimating unit comprising a solid paraboloid of light transmitting material with a plain front face perpendicular to the axis of the paraboloid, said paraboloid having a paraboloidal recess in the apex thereof, the focus and axis of the paraboloidal recess being coincident with the focus and axis of the paraboloid and the surfaces of the paraboloid and paraboloidal recess respectively being complementary portions of identical paraboloidal surfaces.

6. An auto-collimating unit in accordance with claim 5 in which the surface of the paraboloid is provided with a plurality of right angled grooves extending longitudinally of the axis of the unit.

ARTHUR F. ECKEL.